(12) United States Patent
Gruber et al.

(10) Patent No.: US 11,137,095 B2
(45) Date of Patent: Oct. 5, 2021

(54) METHOD FOR JOINING PIPE PIECES AND CENTERING DEVICE FOR THE JOINING PROCESS

(71) Applicant: agru Kunststofftechnik Gesellschaft m.b.H., Bad Hall (AT)

(72) Inventors: Erich Gruber, Steyr-Gleink (AT); Albert Lueghamer, Sierning (AT)

(73) Assignee: agru Kunststofftechnik Gesellschaft m.b.H., Bad Hall (AT)

(*) Notice: Subject to any disclaimer, the term of this patent is extended or adjusted under 35 U.S.C. 154(b) by 405 days.

(21) Appl. No.: 16/311,810

(22) PCT Filed: Jun. 28, 2017

(86) PCT No.: PCT/AT2017/060161
§ 371 (c)(1),
(2) Date: Dec. 20, 2018

(87) PCT Pub. No.: WO2018/000010
PCT Pub. Date: Jan. 4, 2018

(65) Prior Publication Data
US 2019/0203860 A1    Jul. 4, 2019

(30) Foreign Application Priority Data
Jun. 29, 2016   (AT) ............................. A 50583/2016

(51) Int. Cl.
*F16L 23/00*        (2006.01)
(52) U.S. Cl.
CPC .................. *F16L 23/003* (2013.01)
(58) Field of Classification Search
CPC ..... F16L 23/028; F16L 23/032; F16L 23/036; F16L 23/02; F16L 23/003; F16L 23/006; F16L 23/0283; B25B 27/16
(Continued)

(56) References Cited

U.S. PATENT DOCUMENTS 3,015,883 A * 1/1962 Brown ...................... F16L 1/10
                                                           29/271
3,875,969 A   4/1975 Sgourakes et al.
(Continued)

FOREIGN PATENT DOCUMENTS

CN    202247135 U   5/2012
DE    26 58 671 A1   7/1977
(Continued)

OTHER PUBLICATIONS

International Search Report of PCT/AT2017/060161, dated Oct. 26, 2017.

*Primary Examiner* — David Bochna
(74) *Attorney, Agent, or Firm* — Collard & Roe, P.C.

(57) ABSTRACT

A method for assembly of a fitting with a pipe piece using a flange connection disposes centering elements on the fitting at a distance from one another on the circumference, and centering bolts are inserted into centering openings of the centering elements and into accommodation openings of the fitting. A collar surface of the pipe piece is aligned on alignment surfaces of the centering elements. Subsequently, a loose flange ring is aligned on the centering bolts via its passage openings. The fitting and the pipe piece, which are aligned with one another, are connected with one another by the flange ring as well as connection elements, and in this regard, the centering elements and centering bolts are removed. Also a method having a similar effect, for assembly of two pipe pieces uses a flange connection, as does a centering apparatus for assembly.

17 Claims, 4 Drawing Sheets

(58) Field of Classification Search
USPC .................................. 285/23, 39; 29/407.1
See application file for complete search history.

(56) References Cited

U.S. PATENT DOCUMENTS

| | | | | |
|---|---|---|---|---|
| 4,052,045 | A * | 10/1977 | Shaddix | ................ F16L 23/003 |
| | | | | 269/43 |
| 4,078,746 | A | 3/1978 | Harris | |
| 4,079,746 | A | 3/1978 | Killian | |
| 4,399,833 | A | 8/1983 | Holtgraver | |
| 4,640,531 | A * | 2/1987 | Forster | ................ F16L 23/003 |
| | | | | 285/24 |
| 4,662,055 | A * | 5/1987 | VanMeter | ............... B25B 27/16 |
| | | | | 29/271 |
| 4,671,324 | A * | 6/1987 | Neill | ....................... B25B 27/16 |
| | | | | 138/44 |
| 4,751,938 | A | 6/1988 | Kerns et al. | |
| 5,004,017 | A * | 4/1991 | White | ....................... F16L 1/26 |
| | | | | 138/106 |
| 5,228,181 | A * | 7/1993 | Ingle | ....................... B25B 27/16 |
| | | | | 228/44.5 |
| 5,560,091 | A * | 10/1996 | Labit, Jr. | ................. B25B 27/16 |
| | | | | 269/43 |
| 6,560,836 | B1 * | 5/2003 | Briscoe | ................ B25B 27/023 |
| | | | | 29/259 |
| 7,806,136 | B2 | 10/2010 | Ochiai et al. | |
| 9,209,613 | B2 | 12/2015 | Piuzzi et al. | |
| 9,506,586 | B2 * | 11/2016 | Van Heerden | ............ F16L 1/26 |
| 9,683,689 | B2 | 6/2017 | Otosaka | |
| 10,180,022 | B1 * | 1/2019 | Garg | ......................... E05D 3/02 |
| 2006/0021834 | A1 | 2/2006 | Kwasniewski | |
| 2006/0049635 | A1 | 3/2006 | Brazier et al. | |
| 2007/0246676 | A1 | 10/2007 | Dalluge et al. | |
| 2012/0038145 | A1 | 2/2012 | Ramos | |
| 2012/0286119 | A1 * | 11/2012 | Scott | ........................ B66C 1/28 |
| | | | | 248/309.1 |
| 2016/0136796 | A1 * | 5/2016 | Baker | ..................... B25B 27/16 |
| | | | | 29/525.11 |
| 2017/0030501 | A1 | 2/2017 | Dudurovic et al. | |

FOREIGN PATENT DOCUMENTS

| | | | |
|---|---|---|---|
| DE | 32 05 178 A1 | 3/1983 | |
| DE | 38 04 498 A1 | 9/1988 | |
| DE | 10 2015 210486 A1 | 12/2015 | |
| EP | 0 181 659 A1 | 5/1986 | |
| FR | 3055683 A1 * | 3/2018 | ............ B25B 27/16 |
| GB | 2 433 102 A | 6/2007 | |
| KR | 20140003489 U | 6/2014 | |
| WO | 2011/055100 A2 | 5/2011 | |
| WO | 2015/089562 A1 | 6/2015 | |

* cited by examiner

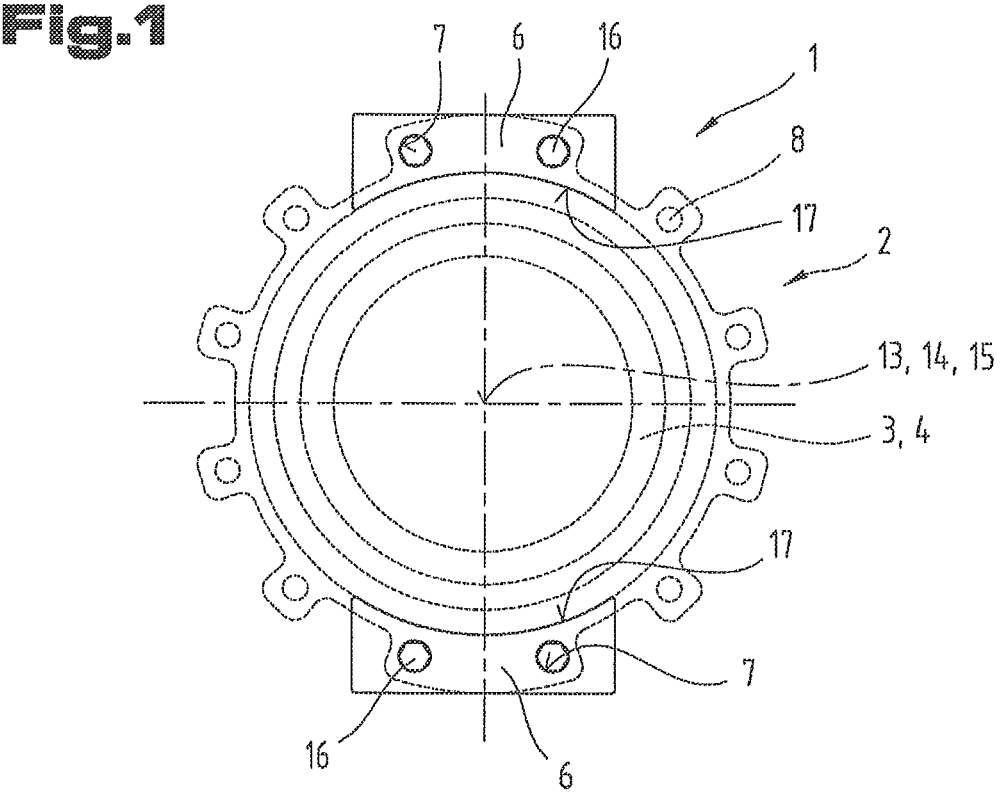
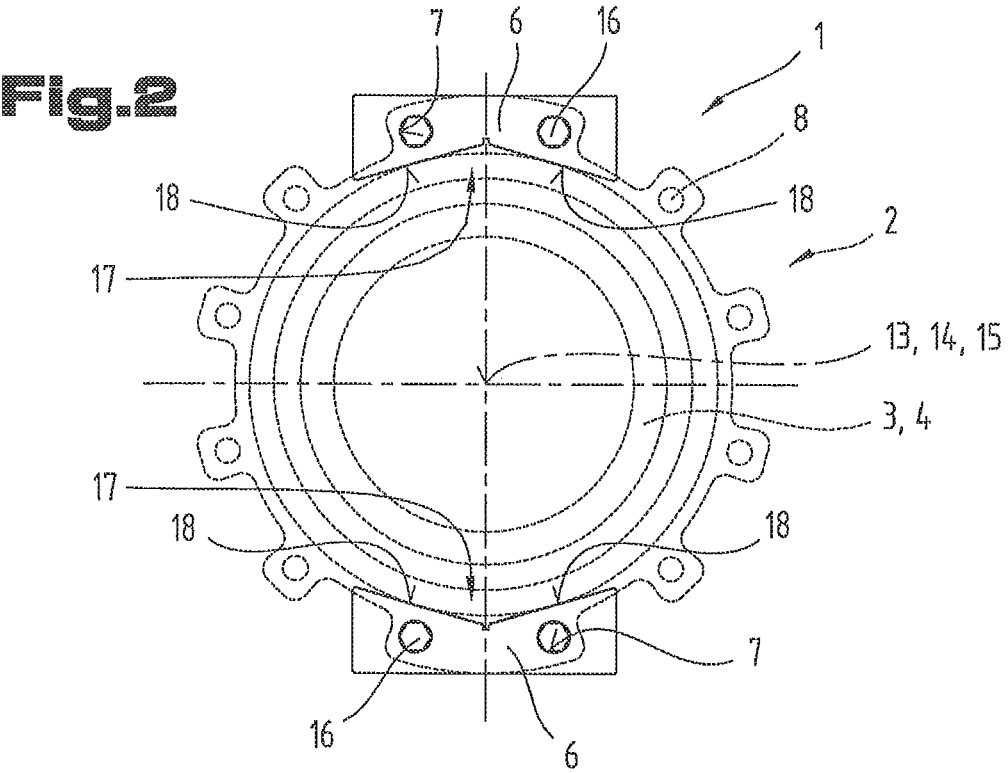

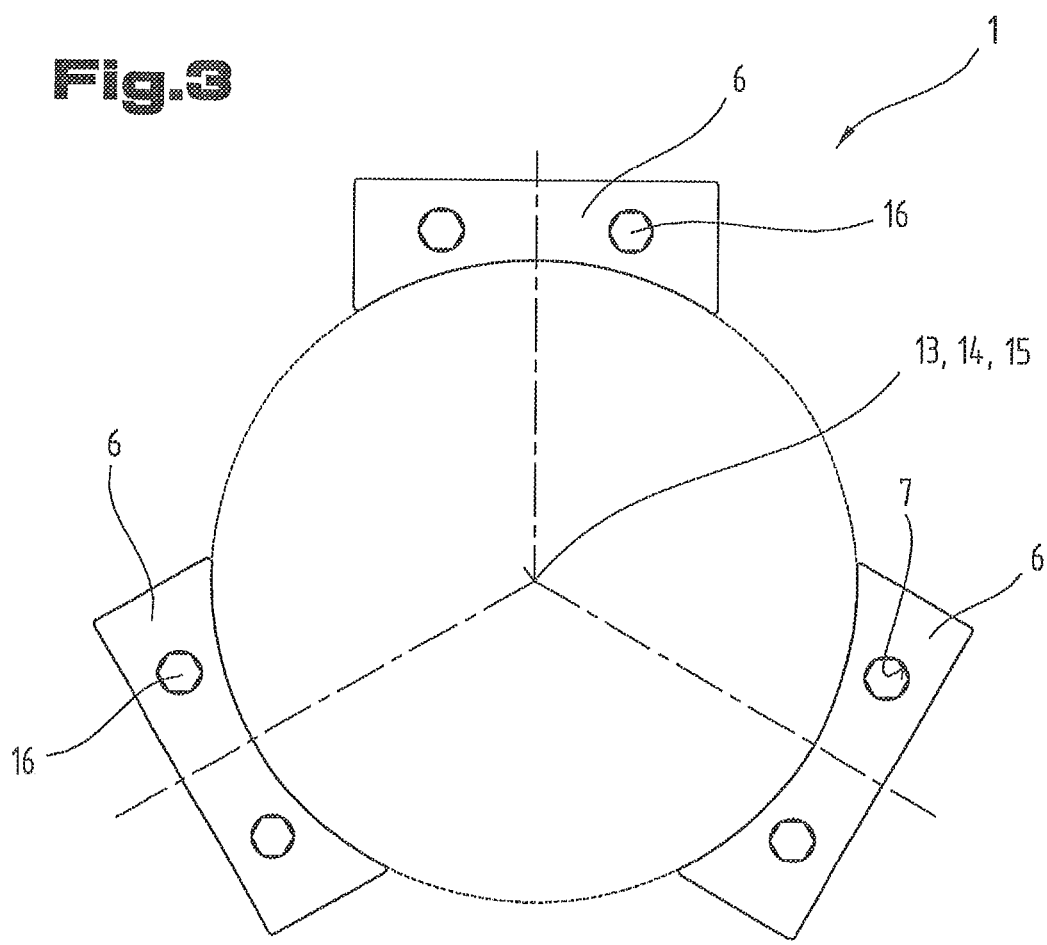
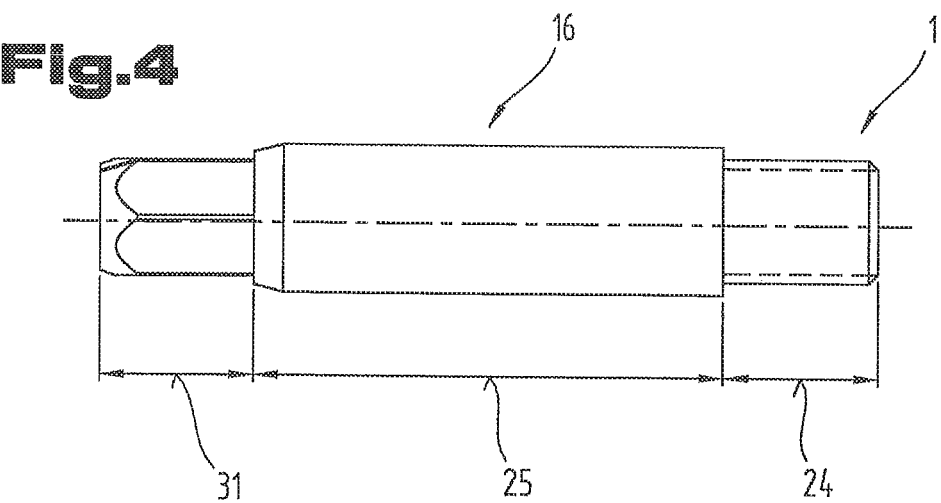

METHOD FOR JOINING PIPE PIECES AND CENTERING DEVICE FOR THE JOINING PROCESS

CROSS REFERENCE TO RELATED APPLICATIONS

This application is the National Stage of PCT/AT2017/060161 filed on Jun. 28, 2017, which claims priority under 35 U.S.C. § 119 of Austrian Application No. A 50583/2016 filed on Jun. 29, 2016, the disclosure of which is incorporated by reference. The international application under PCT article 21(2) was not published in English.

BACKGROUND OF THE INVENTION

1. Field of the Invention

The invention relates to a method for assembly of a fitting with a pipe piece by means of a flange connection, to a method for assembly of two pipe pieces by means of a flange connection, and to a centering apparatus for assembly.

2. Description of the Related Art

U.S. Pat. No. 4,079,746 A and DE 26 58 671 A, which proceeded from it, describe a shut-off organ for pipelines, in particular a throttle valve, which has an arrangement for attaching the shut-off organ between two flange connectors. Each of the flange connectors has a flow channel and is equipped with a ring-shaped flange that projects radially away from the flow channel. The shut-off organ has a housing body, which has a flow passage, within which a shut-off element is disposed. The shut-off element can be moved between a first position, in which it closes the flow passage off, and a second position, in which it opens the flow passage. An adapter device is attached to the housing body. Alignment means in the form of bolts or screws are provided for flush alignment between the adapter device and the flanges, so as to reciprocally align the flow channels within the flanges and the flow passage. It is disadvantageous, in this connection, that the adapter device that is attached to the housing body of the shut-off organ continues to remain on the shut-off organ even after reciprocal alignment and connection of the pipelines.

A method for joining flanges that have a smooth sealing strip, with the interposition of a flat seal for a flange connection, which seal ends with the outer edge of the sealing strip, as well as suitable means for carrying out the method are known from DE 38 04 498 A1. To align the flat seal, adjustment bolts having a tight radial play are introduced into at least two bores that are arranged in offset manner, to such an extent that the gap formed between the flanges has been bridged. Then the flat seal is inserted into a gap formed between the flanges, and laid against the adjustment bolts and thereby aligned. Subsequently, a plurality of screws is passed through bores uniformly distributed over the circumference of the flanges, with equalization play, and joined with nuts to form screw connections. Reciprocal alignment of the bores disposed in the flanges is not possible. After removal of the adjustment bolts, these are also replaced with a screw connection.

SUMMARY OF THE INVENTION

It was the task of the present invention to overcome the disadvantages of the prior art and to make available a method and an apparatus by means of which a user is in a position to undertake simple assembly of a fitting with a pipe piece or of two pipe pieces, and reciprocal fixation by means of a flange connection, and, in this regard, to be able to use the same centering apparatus once again, after alignment and assembly, for a further alignment process.

This task is accomplished by means of a method having the same effect and an apparatus in accordance with the claims.

In the case of a first possible method for assembly of a fitting, in particular a shut-off valve, a throttle valve, or a butterfly valve, with a pipe piece and with a flange connection, the following method steps are provided or the following steps are to be carried out:

making available the fitting, which has a level sealing surface and multiple accommodation openings disposed distributed over the outer circumference, wherein the sealing surface is aligned in the perpendicular direction with reference to a longitudinal axis of the fitting;

making available a pipe piece, which has a face surface that can face the sealing surface of the fitting, and which has a collar, wherein the collar is configured, on its outer circumference, with an outer collar surface, and the face surface is aligned, with reference to a longitudinal axis of the pipe piece, in the perpendicular direction to the axis;

making available a loose flange ring, which has multiple passage openings disposed distributed over the circumference;

making available a centering apparatus comprising at least two centering elements and at least four centering bolts, wherein at least two centering openings are configured in the centering elements, in each instance, and the centering openings are disposed, in each instance, at the same normal line distance from two accommodation openings of the fitting that are disposed one behind the other in the circumference direction, as well as from two passage openings of the loose flange ring that are disposed one behind the other in the circumference direction, and each of the centering elements is configured with an alignment surface that can face the outer collar surface of the collar;

making available multiple connection elements, which connection elements serve to connect the loose flange ring with the fitting;

placing the at least two centering elements on the fitting at a distance from one another on the circumference, in a coaxial position from their centering openings, with regard to the accommodation openings in the fitting;

inserting the centering bolts into the centering openings of the centering elements, as well as into the accommodation openings of the fitting;

bringing the pipe piece between the at least two centering elements, and, in this regard, aligning the outer collar surface of the collar with the alignment surfaces of the centering elements;

setting the loose flange ring over the pipe piece and aligning the loose flange ring on the centering bolts, in that the centering bolts are held by the respective passage openings of the loose flange ring;

inserting multiple connection elements into passage openings of the loose flange ring that are still free, as well as into the corresponding accommodation openings of the fitting, and tightening the connection elements;

removing the centering apparatus;

inserting further connection elements into the remaining passage openings of the loose flange ring that are still free, as well as into the corresponding accommodation openings of the fitting, and tightening the further connection elements.

It is advantageous, in the case of this method of procedure, that in the case of the method of procedure selected here for assembly or joining of a fitting with a pipe piece and the subsequent connection with one another by means of a flange connection, reciprocal alignment of all the components to be joined, namely the fitting, the pipe piece, and the loose flange ring, can be created by means of a flange connection, due to the selected centering or alignment apparatus, in simple manner, with sufficiently precise reciprocal positioning relative to one another for the subsequent connection process of the flange connection. Since the centering or alignment apparatus can already be affixed and held on one of the components to be joined, in the present exemplary embodiment on the fitting, all the other components can be aligned and positioned with it during the further sequence. In this way, the alignment and joining process can be simplified. Furthermore, however, even after the joining process has taken place and the flange connection has been partially connected, the centering or alignment apparatus can be completely removed from the components to be joined with one another, and thereby the further connection elements can be affixed to form the complete flange connection. Because of the complete removal possibility of the centering apparatus, no unnecessary components remain in the region of the components to be joined together with one another, and multiple use of the apparatus is thereby possible.

Furthermore, a method of procedure is advantageous, in which the longitudinal axis of the pipe piece is aligned in coaxial alignment with regard to the longitudinal axis of the fitting. In this way, precisely flush alignment of the components to be joined, which are disposed one behind the other in the axial direction, can be achieved.

A further advantageous method of procedure is characterized in that at least one sealing element is inserted between the sealing surface of the fitting and the face surface of the pipe piece that faces it. By means of providing at least one additional element, an even better sealing effect and sealing of the components to be joined with one another can thereby be achieved. In the case of approximately the same selection of the outer dimensions of the sealing element with regard to the collar of the pipe piece, the at least one sealing element can be aligned or centered directly during assembly, when using the centering device, without a separate process or an additional apparatus being required for this.

A method variant in which the accommodation openings disposed in the fitting are formed by threaded bores is also advantageous. In this way, assembly of the components to be joined can be significantly simplified, since the connection elements merely need to be screwed into the threaded bores and tightened for the clamping connection.

Another method of procedure is characterized in that the centering bolts of the centering apparatus are each configured with a first partial section and a second partial section that follows the first in the axial direction, wherein the first partial section is provided with an outside thread and the second partial section is configured to be smooth and cylindrical. By means of the special configuration of the centering bolts, the installation process of the bolts on one of the components to be joined can thereby be facilitated, and subsequently, nevertheless, sufficiently precise reciprocal centering and alignment of the centering or alignment element as well as of the loose flange ring can be facilitated. In the case of a corresponding selection of the axial expanse, the centering bolt preferably projects through the loose flange ring, so as to be able to carry out the subsequent removal and release from the fitting in simpler manner.

Furthermore, a method of procedure is advantageous, in which the centering bolts of the centering apparatus are configured, in each instance, with a tetragonal or hexagonal cross-section on their side that faces away from the first partial section. By means of providing a polygonal, in particular a tetragonal or hexagonal projection on the centering bolt, both the attachment process and the loosening process can be facilitated by means of a hand-held tool or also by means of a mechanically operated and/or controlled activation device, and carried out in reliable manner.

A further advantageous method of procedure is characterized in that in the case of a position of the loose flange ring on the collar of the pipe piece, lying on it in the axial direction, an axial gap is configured between at least one flange surface that faces the centering elements and the centering elements. Due to the lesser axial expanse of the centering or alignment elements in the axial direction, jamming of the elements between the components to be joined can thereby be prevented. However, in this way removal can still be carried out in the case of a flange connection that has already been tightened.

Independent of this, however, the task of the invention can also be accomplished by means of a method for assembly of two pipe pieces and a flange connection, in that the following steps are carried out:

making available a first pipe piece, which has a first face surface and which has a first collar, wherein the first collar is configured, on its outer circumference, to have a first outer collar surface, and the first face surface is aligned in the perpendicular direction to it with reference to a first longitudinal axis of the first pipe piece;

making available a second pipe piece, which has a second face surface and which has a second collar, wherein the second collar is configured, on its outer circumference, to have a second outer collar surface, and the second face surface is aligned in the perpendicular direction to it with reference to a second longitudinal axis of the second pipe piece;

making available a first loose flange ring having multiple first passage openings disposed distributed over the circumference;

making available a second loose flange ring having multiple second passage openings disposed distributed over the circumference;

making available a centering apparatus comprising at least two centering elements and at least four centering bolts, wherein at least two centering openings are configured in the centering elements, in each instance, and the centering openings are disposed, in each instance, at the same normal line distance from two first and second passage openings of the two flange rings that are disposed one behind the other in the circumference direction, and each of the centering elements is configured with an alignment surface that can face the first and second outer collar surface of the first and second collar;

making available multiple connection elements, which connection elements serve to connect the first loose flange ring with the second loose flange ring;

placing the at least two centering elements at a distance from one another on the circumference on the first loose flange ring, in a coaxial position from their centering openings, with regard to the first passage openings of the first loose flange ring;

inserting the centering bolts into the centering openings of the centering elements, as well as into the first passage openings of the first loose flange ring, and fixing the at least two centering elements and the centering bolts in place on the first loose flange ring;

bringing the first pipe piece between the at least two centering elements, and, in this regard, aligning the outer first collar surface of the first collar with the alignment surfaces of the centering elements;

bringing the second pipe piece between the at least two centering elements, and, in this regard, aligning the outer second collar surface of the second collar with the alignment surfaces of the centering elements;

setting the second loose flange ring over the second pipe piece and aligning the second loose flange ring on the centering bolts, in that the centering bolts are held by the respective second passage openings of the second loose flange ring;

inserting multiple connection elements into first passage openings of the first loose flange ring that are still free, as well as into the corresponding second passage openings of the second loose flange ring that are still free, and tightening the connection elements;

removing the centering apparatus;

inserting further connection elements into the remaining first passage openings of the first flange ring that are still free, as well as into the second corresponding passage openings of the second loose flange ring that are still free, and tightening the further connection elements.

In the case of these method steps, it is advantageous that for assembly or joining of two pipe pieces and subsequent connection with one another by means of a flange connection, reciprocal alignment of all the components to be joined, namely of the two pipe pieces and the loose flange rings, can be created by means of the selected centering or alignment apparatus, in simple manner, with sufficiently precise reciprocal positioning relative to one another for the subsequent connection process of the flange connection. Since the centering or alignment apparatus can already be affixed and held on one of the components to be joined, in the present exemplary embodiment on one of the flange rings, before the joining process, all the further components can be aligned and positioned with it during the further sequence. In this way, the alignment and joining process can be simplified. Furthermore, however, even after the joining process has taken place and the flange connection has been partially connected, the centering or alignment apparatus can be completely removed from the components to be joined with one another, and thereby the further connection elements can be affixed to form the complete flange connection. Because of the complete removal possibility of the centering apparatus, no unnecessary components remain in the region of the components to be joined together with one another, and multiple use of the apparatus is thereby possible.

A method variant in which the two pipe pieces are brought into a position in which their face surfaces lie against one another when the pieces are brought between the at least two centering elements is also advantageous. In this way, easy tightening of the flange connection and thereby tilt-free positioning of the two pipe pieces against one another can subsequently be achieved.

Another method of procedure is characterized in that the first longitudinal axis of the first pipe piece is aligned in coaxial alignment with regard to the second longitudinal axis of the second pipe piece. In this way, precisely flush alignment relative to one another of the components to be joined one behind the other in the axial direction can be achieved.

Furthermore, a method of procedure in which at least one sealing element is inserted between the first face surface of the first pipe piece and the second face surface of the second pipe piece, which faces the first face surface, is advantageous. By means of providing at least one additional element, an even better sealing effect and sealing of the components to be joined with one another can thereby be achieved. In the case of approximately the same selection of the outer dimensions of the sealing element with regard to the collar of the respective pipe piece, the at least one sealing element can be directly aligned or centered during assembly, when using the centering apparatus, without a separate process or an additional apparatus being necessary for this purpose.

A further advantageous method of procedure is characterized in that in the case of a position of the first loose flange ring lying on the first collar of the first pipe piece, and in the case of a position of the second loose flange ring lying on the second collar of the second pipe piece, an axial gap is formed between the centering elements and at least one flange surface that faces the centering elements. Due to the lesser axial expanse of the centering or alignment elements in the axial direction, jamming of the elements between the components to be joined can thereby be prevented. However, in this way removal can still be carried out in the case of a flange connection that has already been tightened.

A method variant in which the centering elements are disposed in a diametrical position relative to one another in the case of a selected number of two centering elements is also advantageous. Due to the placement of the two centering elements diametrically and therefore opposite one another, sufficiently precise positioning relative to one another can be achieved in this way.

Another method of procedure is characterized in that, in the case of a selected number of more than two centering elements, the centering elements are disposed distributed over the circumference, in particular disposed distributed uniformly over the circumference. As a result, precise alignment and centering relative to one another can be achieved even in the case of greater outer dimensions of the components to be joined.

A further advantageous method of procedure is characterized in that the alignment surface of the centering element is formed by a partial section of a hollow cylinder surface. In the case of correspondingly selected tolerances relative to one another, very precise alignment and positioning, in particular of the pipe pieces with their collar disposed on them, can thereby be achieved.

A method variant in which the alignment surface of the centering element is formed by two partial alignment surfaces that run toward one another at an angle and have a planar surface is also advantageous. In the case of bodies to be centered that have a round configuration, in particular, use of the same centering elements independent of the diameter, within wide ranges, can be made possible by the partial alignment surfaces that are aligned to run toward one another. The partial alignment surfaces on the centering element form a V cut-out, so as to thereby not only create multiple use due to the removal possibility of the centering elements, but also to allow multiple use in the case of outer dimensions that are different from one another, in particular the diameters of the pipe pieces with their collar.

However, the task of the invention can also be accomplished, if applicable on its own and independently, by means of a centering apparatus for assembly of a fitting, in particular a shut-off valve, a throttle valve or a butterfly valve, with a pipe piece and a flange connection, or for assembly of two pipe pieces and a flange connection, using at least one centering element.

The advantage achieved in this way lies in that it is possible, by means of this centering and alignment apparatus, to achieve positioning of the components to be joined with sufficient precision relative to one another, and to be able to remove the centering and alignment apparatus after the positioning or centering process, in the status of the components in which they are partially connected with one another, and to use or utilize it again. In this way, material resources can be saved, since it is possible, by means of the combination of centering elements and centering bolts, to align even those pipe pieces in which a radial distance exists between the outer collar surface of the collar on the pipe piece and the accommodation openings for the centering bolts, with the pieces aligned and positioned relative to one another. This radial distance can be bridged by means of a corresponding configuration and dimensional selection of the centering elements. In this way, existing openings or breakthroughs that are present and are disposed or provided in the components to be joined, for their later connection, can be used not only for the reciprocal subsequent connection but also for the alignment and centering process.

Furthermore, it can be advantageous if the alignment surface of the centering element is formed by a partial section of a hollow cylinder surface. In the case of correspondingly selected tolerances relative to one another, very precise alignment and positioning, in particular of the pipe pieces with their collars disposed on them, can be achieved in this way.

Finally, another embodiment can be characterized in that the alignment surface of the centering element is formed by two partial alignment surfaces that run at an angle toward one another and have a planar surface. In the case of bodies to be centered that have a round configuration, in particular, use of the same centering elements independent of the diameter, within wide ranges, can be made possible by the partial alignment surfaces that are aligned to run toward one another. The partial alignment surfaces on the centering element form a V cut-out, viewed in cross-section. In this way, not only can multiple use be created due to the removal possibility of the centering elements, but also, a multiple use possibility can be made possible in the case of outer dimensions that are different from one another, in particular the diameters of the pipe pieces with their collar.

BRIEF DESCRIPTION OF THE DRAWINGS

For a better understanding of the invention, it will be explained in greater detail using the following figures.

The figures show, each in a greatly simplified schematic representation:

FIG. 1 a first possible embodiment of a centering or alignment apparatus, in a front view;

FIG. 2 a second possible embodiment of a centering or alignment apparatus, in a front view;

FIG. 3 a third possible embodiment of a centering or alignment apparatus, in a front view;

FIG. 4 a centering bolt of the centering or alignment apparatus according to FIGS. 1 to 3;

DETAILED DESCRIPTION OF THE PREFERRED EMBODIMENTS

Figure 5:
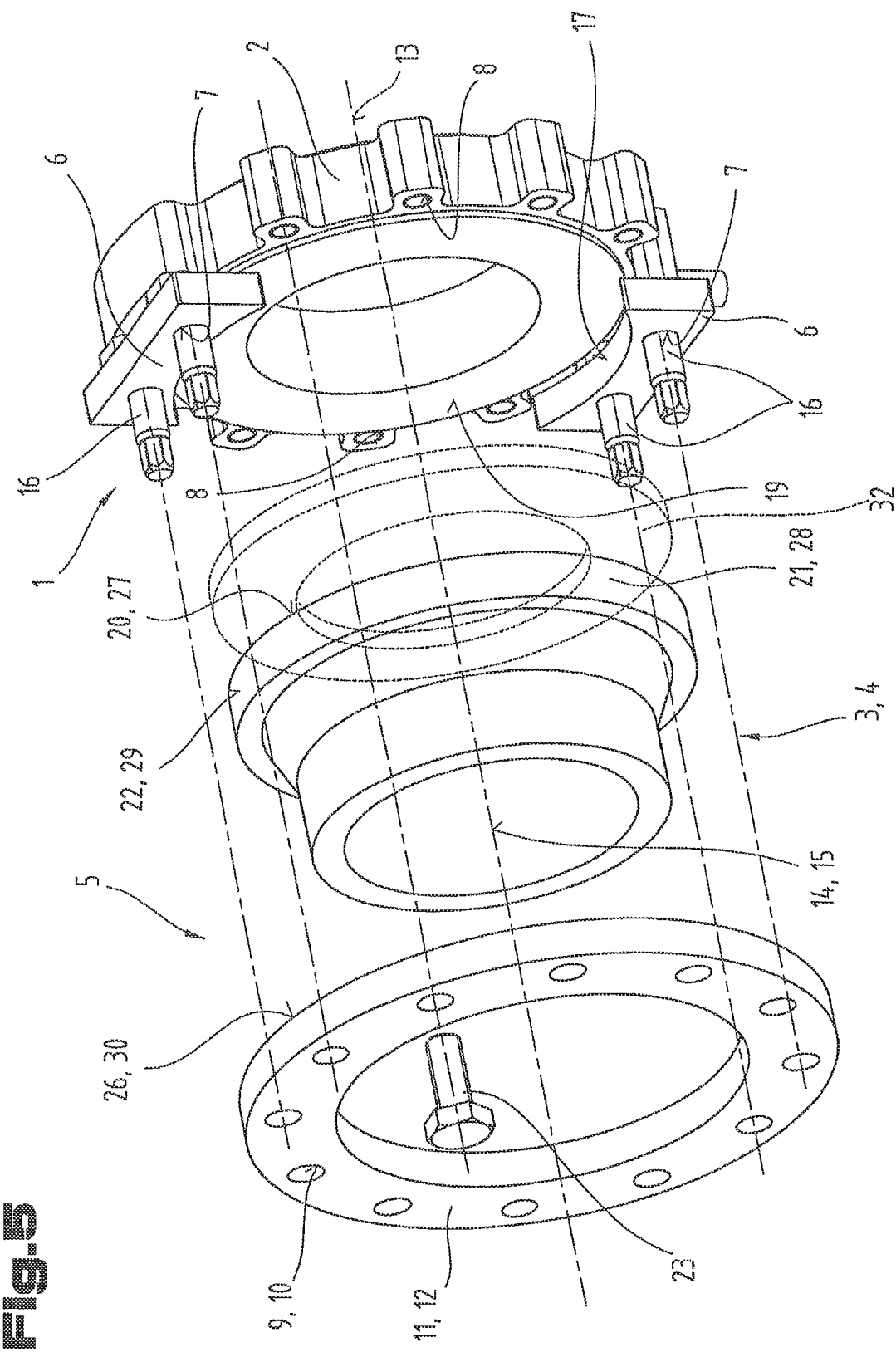
FIG. 5 a fitting intended for assembly with a pipe piece, in a position of the components to be joined in which they are still at a distance from one another, in a diagrammatic representation.

As an introduction, it should be stated that in the different embodiments described, the same parts are provided with the same reference symbols or the same component designations, wherein the disclosures contained in the description as a whole can be transferred analogously to the same parts having the same reference symbols or the same component designations. Also, the position information selected in the description, such as at the top, at the bottom, on the side, for example, refers to the figure being directly described and shown, and this position information should be transferred analogously to the new position in the event of a change in position.

The term "in particular" should be understood, hereinafter, to mean that this involves a possible more special embodiment or a more detailed specification of an object or of a method step, but does not necessarily have to represent a compulsory, preferred embodiment of the same or a compulsory method of procedure.

In the first FIGS. 1 to 4, possible embodiments and arrangements of a centering apparatus 1 are shown, which can be used or utilized either for assembly of a fitting 2 with a pipe piece 3, 4, or for assembly of two pipe pieces 3, 4, by means of a flange connection 5 that will still be described in greater detail below, but is not shown in any detail here. However, the centering apparatus 1 can also be referred to as an alignment apparatus, by means of which it is possible to align a pipe piece 3, 4 with regard to the fitting 2, in terms of its axial location and position, and to hold it in this position until reciprocal connection with one another by means of the flange connection 5. However, the same also holds true for the assembly and alignment of two pipe pieces 3, 4 relative to one another.

In the following, the term of fitting 2 will be understood, among other things, to mean a shut-off valve, a throttle valve or a butterfly valve. Pipes made of plastic—in other words plastic pipes—and/or also pipes made of metallic materials, in the most varied lengths or axial expanses, are particularly understood to be pipe pieces 3, 4. The pipe pieces can also be plastic pipes having at least one weld neck collar, for example.

In the representation of a first embodiment possibility according to FIG. 1, it is shown that the centering apparatus 1 has two centering elements 6 or that two centering elements 6 are provided. However, the centering element(s) 6 can also be referred to as alignment elements. In each of the centering elements 1, at least two centering openings 7 are configured or disposed, in each instance. The at least two centering openings 7 are disposed to correspond with two accommodation openings 8 disposed in the fitting 2 to be centered. If, in contrast, two pipe pieces 3, 4 are to be aligned relative to one another or centered relative to one another, the at least two centering openings 7 are to be disposed or configured in a placement corresponding to passage openings 9, 10 in flange rings 11, 12, which will still be described in greater detail below.

Furthermore, here it is not yet shown that the fitting 2, which is shown only in vague manner, forms or defines a longitudinal axis 13. However, the same also holds true for the two pipe pieces 3, 4, which were described above and indicated schematically, which in turn each also form or define their own longitudinal axis 14, 15. Furthermore, the centering apparatus 1 comprises a centering bolt 16 for each of the at least two centering openings 7 of the at least two centering elements in each instance. If each of the at least two centering elements 6 comprises two centering openings 7, in each instance, then at least four centering bolts 16 should be provided. In this regard, one of the centering bolts 16 is then accommodated in each of the at least two centering openings 7 of each of the centering elements 7, in each instance. To form the centering apparatus 1, the at least two centering elements 6 are disposed offset from one another in the circumference direction or circumferentially with regard to a longitudinal axis 14, 15 of the pipe piece 3, 4 to be centered. In this regard, the circumferentially spaced-apart arrangement should be selected in such a manner that perfect alignment and/or centering of the pipe piece 3, 4 to be aligned or centered is possible by the at least two centering elements 6.

In order to serve as a centering element 6, each of the centering elements 6 has at least one alignment surface 17. In this regard, each of the alignment surfaces 17 faces or can face the longitudinal axis 14, 15, and preferably has an axial expanse that runs in the parallel direction with reference to the longitudinal axis 14, 15. The alignment or centering of the pipe piece 3, 4 described below can take place on these alignment surfaces 17. In the case of the exemplary embodiment shown in FIG. 1, the alignment surface 17 of each of the centering elements 6 is formed by a partial section of a hollow cylinder surface.

In FIG. 2, fundamentally the same arrangement of the centering apparatus 1 is described above is shown, which in turn comprises the at least two centering elements 6 and the at least four centering bolts 16.

In contrast to the embodiment described above in FIG. 1, here only a different configuration of the alignment surface 17 on the centering element 6 is shown. Instead of the partial section of the hollow cylinder surface, in this exemplary embodiment the alignment surface 17 is formed by two partial alignment surfaces 18, which are aligned to run at an angle toward one another and preferably have a planar surface. Greater flexibility of the individual centering elements 6 can be achieved by means of these partial alignment surfaces 18 that are aligned in the manner of a planar surface and run toward one another, since in this way, also pipe pieces 3, 4 that have a different outer dimension and thereby a different dimension at the individual partial alignment surfaces 18 can be laid against one another and thereby aligned or centered.

If, as shown in the two FIGS. 1 and 2, two centering elements 6 are selected to form the centering apparatus 1, the circumferential arrangement of the centering elements 6 can take place in such a manner that these elements can be arranged in a position diametrical to one another. By means of the placement of the two centering elements 6 diametrical to one another, they are disposed to lie opposite one another with reference to one of the longitudinal axes 13 to 15.

In FIG. 3, it is now shown that it is also possible to configure the centering apparatus 1 with more than two centering elements 6. In this regard, it should be mentioned that in FIG. 3, only the embodiment of the centering element 6 as was shown and described in FIG. 1 is shown in FIG. 3, but the multiple arrangement of more than two centering elements 6 can also take place with an embodiment as shown and described in FIG. 2.

In the exemplary embodiment present here, a number of three units of centering elements 6 is shown, which are preferably arranged or can be arranged distributed uniformly over the circumference. By means of the uniform circumferential distribution of three centering elements 6, these are arranged by an extent at an angle of 120° relative to one another. This circumferential distribution can take place uniformly distributed over the circumference, but this is not compulsorily necessary, and the centering elements 6 can also enclose a different angle or an angle extent between them, relative to one another. However, a number of centering elements 6 could also be selected, which is greater than three units. This, for example, four, five, six, seven or eight and even more centering elements 6 could be provided, for example, as a function of the dimension and thereby of the outer dimension. In this regard, once again, each of the centering elements 6 should have at least two of the centering bolts 16 assigned to it for its centering, or should be provided with them.

In FIG. 4, a possible embodiment of a centering bolt 16 of the centering apparatus 1 is shown. The centering bolt has a first partial section 24 and a subsequent second partial section 25, seen in the axial direction. In order to be able to produce a connection with the fitting 2, in particular its accommodation opening 8 or a flange ring 11 or 12, the first partial section 24 of the centering bolt 16 can be provided with an outside thread. In this way, the centering bolt 16 can be easily connected with the fitting 2, for example. The second partial section 25, which follows the first, is preferably configured to be smooth and cylindrical. Furthermore, it is also possible that the centering bolt of the centering apparatus 1 is configured with a polygonal, in particular a tetragonal or a hexagonal cross-section on its side facing away from the first partial section 24. This part of the centering bolt 16 can form a third partial section 31. In sum, the three partial sections 24, 25, and 31 can define the entire axial length expanse. In this way, affixation of the connection elements 23, which will still be described below, with the fitting 2 or the flange rings 11, 12, can be facilitated, if applicable using a tool that is configured accordingly for this purpose.

In FIG. 5, an exemplary embodiment is now shown, in which the fitting 2 is to be assembled with a pipe piece 3 or 4, by means of the flange connection 5, to form a unit, wherein the reciprocal alignment and centering is supposed to take place by means of the centering apparatus 1 described above. In the following, reference is made predominantly only to the pipe piece 3, wherein however, it would also be possible to use the second pipe piece 4 instead of the first pipe piece 3.

The fitting 2, in particular a shut-off valve, a throttle valve, a butterfly valve or the like is made available for assembly and has the accommodation openings 8 described and indicated above, distributed over the outer circumference. In the region of the flange connection 5 to be formed, the fitting 2 furthermore also has a sealing surface 19, which is preferably configured to be planar. In this regard, the sealing surface 19 is preferably aligned in the perpendicular direction with reference to the longitudinal axis 13 of the fitting 2, and thereby defines a plane that is aligned in a perpendicular alignment with reference to the longitudinal axis 13.

Furthermore, in the exemplary embodiment shown here, a pipe piece 3 or 4 should be made available. In this regard, it should be mentioned that the pipe piece 3 or 4 can be configured with the most varied axial expanses. The pipe piece 3 furthermore has a face surface 20 that can face the sealing surface 19, as well as a collar 21 that projects beyond the pipe piece 3 radially toward the outside. The collar 21 furthermore has an outer collar surface 22 on its outer circumference, or is configured with such a collar surface 22. The face surface 20 is aligned in the perpendicular direction with regard to the longitudinal axis 14 or 15 of the pipe piece 3 or 4. The outer collar surface 22 is preferably configured as a cylinder surface, wherein the collar 21 is preferably disposed or configured to run completely around the circumference of the pipe piece 3, 4. Preferably, the collar 21 is configured in one piece with the pipe piece 3, 4. However, it would also be possible to configure the collar 21 as a separate component and to connect it with the base pipe of the pipe piece 3, 4 or to configure it on that.

Furthermore, a loose flange ring 11 or 12 should still be provided for configuring the flange connection 5, which ring is provided with multiple passage openings 9, 10 that are disposed distributed over the circumference.

To assemble the fittings 2 with the pipe piece 3 or 4 and the loose flange ring 11 or 12, furthermore one of the embodiments of the centering apparatus 1 described above is used or utilized. As has already been described above, at least two centering elements 6 and at least four centering bolts 16 should be provided to form the centering apparatus 1. The at least two centering openings 7 disposed or configured in the centering elements 6 are disposed or aligned with one another in such a manner that these are disposed, in each instance, at the same normal line distance from two accommodation openings 8 of the fitting 2 that are disposed one behind the other in the circumference direction, as well as from two passage openings 9 or 10 of the loose flange ring 11 or 12 that are disposed one behind the other in the circumference direction.

Furthermore, as a function of the number of accommodation openings 8 in the fitting 2, as well as preferably the same number of passage openings 9 or 10 of the flange ring 11 or 12, a corresponding unit number or number of connection elements 23 should be made available or provided. The connection elements 23 serve to connect the loose flange ring 11 or 12 with the fitting 2.

Once the components described above have been made available, placement of the two centering elements on the fitting 2 takes place in a coaxial position from its centering openings 7 with reference to the accommodation opening(s) 8 in the fitting 2, at a circumferential distance from one another. Once this alignment has taken place, the centering bolts 16 can be inserted into the centering openings 7 of the centering elements 6 and into the accommodation openings 8 of the fitting 2.

Independent of this, however, it would also be possible to first insert the centering bolts 16 into the corresponding accommodation openings 8 in the fitting 2, and subsequently to bring each of the centering elements 6, with its centering openings 7, into a position that accommodates the centering bolts 16.

Once the at least two centering elements 6 and the centering bolts 16 required for this purpose are in place, they form the centering apparatus 1. Subsequently, bringing the pipe piece 3 or 4 between the at least two centering elements 6 takes place. During this process, alignment of the outer collar surface 22 of the collar 21 with the respective alignment surfaces 17 of the centering elements 6 provided for this purpose takes place. Once the pipe piece 3 or 4 has now been aligned with regard to the fitting 2, the loose flange ring 11 or 12 can be set onto or brought over the pipe piece 3 or 4. Furthermore, in this regard, alignment of the loose flange ring 11 or 12 with the centering bolt 16 also takes place, in that the centering bolts 16 are accommodated by the respective passage openings 9 or 10 of the loose flange ring 11 or 12. Subsequently, insertion of multiple connection elements 23 into passage openings 9 or 10 of the loose flange ring 11 or 12 that are still free can take place by means of alignment of the loose flange ring 11 or 12 with its passage openings 9 or 10 with regard to the accommodation openings 8 in the fitting 2. Then the connection elements 21 project through the loose flange ring 11 or 12 and are furthermore also inserted into the corresponding accommodation openings 8 of the fitting 2.

In order to achieve a reciprocal connection or hold of the pipe piece 3 or 4 on the fitting 2, at least individual ones of the connection elements 23 should be tightened, so that the loose flange ring 11 or 12 lies against the collar 21 or 28, and thereby the pipe piece 3 or 4 is pressed against the fitting 2 in known manner. Once sufficient position fixation and positioning of the pipe piece 3 or 4 with regard to the fitting 2 has taken place, the centering apparatus 1 can be removed.

To complete the flange connection 5, insertion of further connection elements 23 into the remaining passage openings 9 or 10 of the loose flange ring 11 or 12 that are still free, as well as into the corresponding accommodation openings 8 in the fitting 2 takes place. Finally, tightening of these further connection elements 23 still takes place. The number of further connection elements 23 depends on the number of centering bolts 16 selected.

Preferably, the longitudinal axis 14 or 15 of the pipe piece 3 or 4 is aligned in coaxial alignment with regard to the longitudinal axis 13 of the fitting 2 by means of the centering apparatus 1.

Furthermore, it is also possible that at least one sealing element 32 is inserted between the sealing surface 19 of the fitting 2 and the face surface 20 of the pipe piece 3 or 4 that faces it. In the present exemplary embodiment, the at least one sealing element 32 is configured as a flat seal and indicated with broken lines. If the outer dimension, in particular the outside diameter, of the first collar 21, which will still be described below, with its first collar surface 22, or of the second collar 28, with its second collar surface 29, corresponds to the outer dimension, in particular the outside diameter, of the sealing element 32, the sealing element 32 can also be aligned and positioned within the course of assembly by means of the centering apparatus 1.

However, one or more O-rings could also be used as a sealing element 32, or in addition to the flat seal.

Depending on the configuration and the type of the accommodation openings 8 in the fitting 2, the connection elements 23 should also be selected accordingly. Preferably, screws are used as a connection element 23, wherein here, the most varied configurations known from the state of the art can be used. Thus, it would be possible to configure the accommodation openings 8 disposed in the fitting 2 as threaded bores. In this case, the connection elements 23 can be formed exclusively by screws or by threaded pins with nuts. If, in contrast, the accommodation openings 8 are configured as breakthroughs or also as passage openings, screws with nuts and, if necessary, washers should be provided as connection elements 23.

During the removal of the centering apparatus 1 as described above, in particular of its centering elements 6, with the connection elements 23 already tightened, and the pipe piece 3 or 4 thereby connected with the fitting 2, it is advantageous if an axial gap is formed between at least one flange surface 26 or 30 of the loose flange ring 11 or 12, which surface faces the centering elements 6, and the centering elements 6, in the case of a position of the loose flange ring 11 or 12 in which it lies on the collar 21 or 28 of the pipe piece 3 or 4 in the axial direction. In this way, jamming of the centering elements 6 between the fitting 2 and the tightened flange ring 11 or 12 can be prevented.

Removing or taking away the centering apparatus 1 can take place in such a manner that first, the centering bolts 16 are removed from the fitting 2 and the flange ring 11 or 12, and subsequently the centering elements 6 can be removed in the radial direction, out of the gap formed between the flange ring 11 or 12 and the fitting 2.

Figure 6:
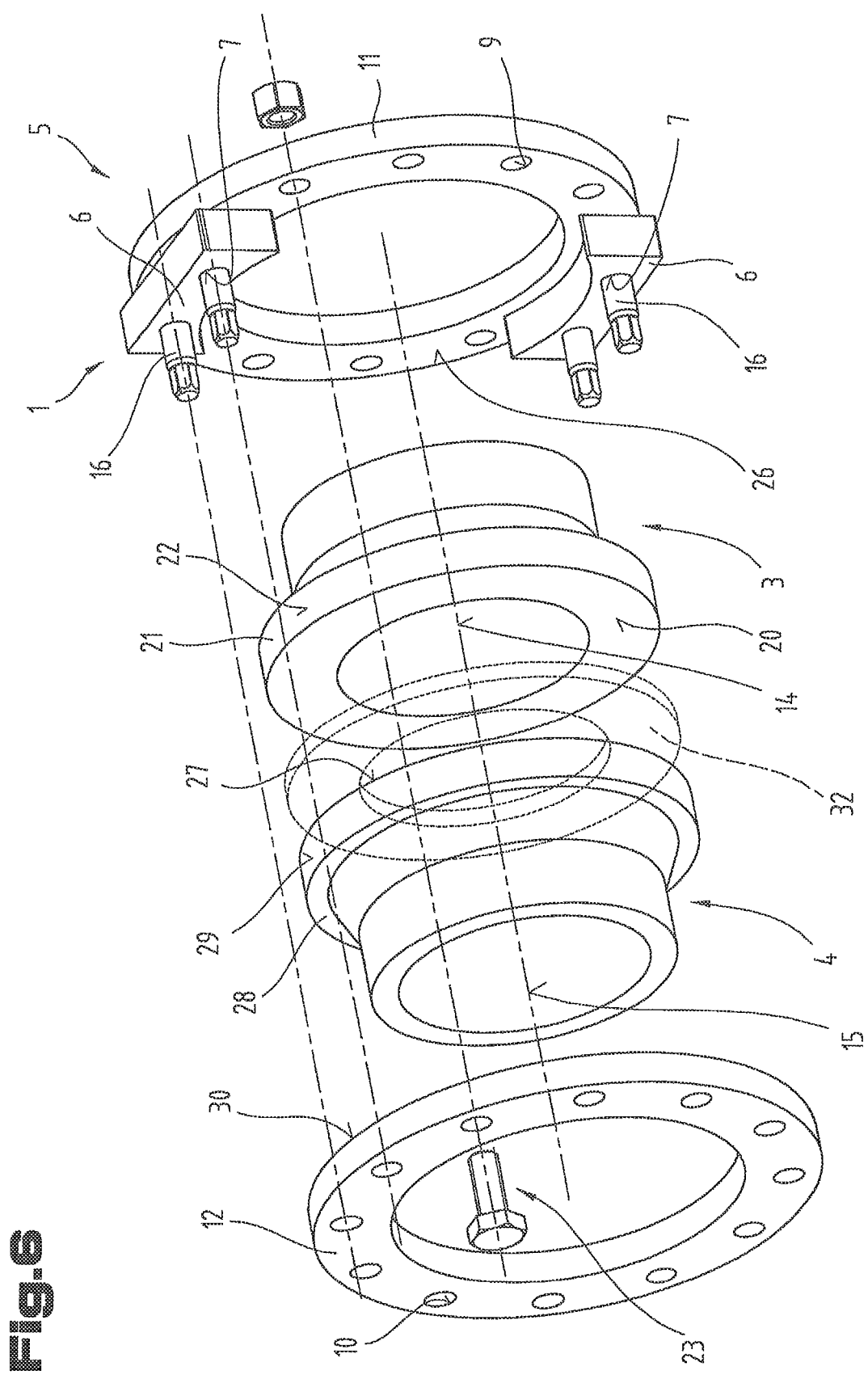
FIG. 6 a first and a second pipe piece intended for assembly, in a position of the components to be joined in which they are still at a distance from one another, in a diagrammatic representation.

In FIG. 6, it is now shown that it is also possible to use the centering apparatus 1 for assembly of two pipe pieces 3, 4 with the flange connection 5. Instead of the fitting 2 described above, here the first pipe piece 3 is connected with the second pipe piece 4 by means of the two flange rings, namely the first flange ring 11 and the second flange ring 12, forming the flange connection 5 with one another.

Since here, the flange connection 5 is formed between two pipe pieces 3 and 4, these are referred to here as the first pipe piece 3 and the second pipe piece 4. The same also holds true for the flange rings 11 and 12, as well as further components of the same type that are also required in multiples. In this regard, the method for assembly of two such pipe pieces 3, 4 can comprise at least the following steps or can be carried out as described below.

Making the first pipe piece 3 available, with its first face surface 20 and with the first collar 21 disposed and configured on it, takes place. The first collar 21 is configured with the first outer collar surface 22 on its outer circumference.

Furthermore, the first face surface 20 is aligned in a perpendicular direction with regard to the first longitudinal axis 14 of the first pipe piece 3.

Fundamentally, the second pipe piece 4 can be configured analogously to the first pipe piece 3 described above. Thus, the second pipe piece 4 can have a second face surface 27 and a second collar 28. The second collar 28 of the second pipe piece 4 is provided or configured with a second outer collar surface 29 on outside outer circumference. In this regard, the second face surface 27 of the second pipe piece 4 is also aligned in the perpendicular direction with regard to the second longitudinal axis 15 of the second pipe piece 4. Furthermore, making the first loose flange ring 11 available, with its first passage openings 9, as well as making available a second loose flange ring 12 with its also multiple second passage openings 10 disposed distributed over the circumference should still be carried out.

The centering apparatus 1 should also be made available, once again, and comprises the at least two centering elements 6 and the at least four centering bolts 16. The placement and alignment of the centering openings 7 should be selected analogously, as has already been described in detail above, and selected as a function of the first and second passage openings 9, 10 of the two flange rings 11, 12.

To connect the first loose flange ring 11 with the second loose flange ring 12, once again multiple connection elements 23 should be made available. Since passage openings 9, 10 that are configured smoothly, in each instance, are generally disposed in the two flange rings 11, 12, connection elements 23 are formed by screws and nuts, and, if applicable, washers and/or locking rings.

Once all the provisioning has taken place, the at least two centering elements 6 are disposed on the first loose flange ring 11, circumferentially at a distance from one another. In this regard, the centering openings 7 of the centering elements 6 are disposed or aligned, in each instance, in a coaxial position with regard to the first of the passage openings 9 of the first loose flange ring 11. Subsequently, insertion of the centering bolts 16 into the centering openings 7 of the centering elements 6 and into the first passage openings 9 of the first loose flange ring 11 can take place. The individual centering bolts 16 can subsequently be fixed in place on the first loose flange ring 11. As has already been described above, however, placement and fixation of the centering bolts 16 on the loose flange ring 11 can take place first, and subsequently affixing the centering elements 6 to form the centering apparatus 1 can take place.

Subsequently, bringing the first pipe piece 3 between the at least two centering elements 6 of the centering apparatus 1 can take place, wherein then, alignment of the outer first collar surface 22 of the first collar 21 on the alignment surfaces 17 of the centering elements 6 takes place. Then the second pipe piece 4 is also brought between the at least two centering elements 6. In this regard, alignment of the outer second collar surface 29 of the second collar 28 with the alignment surfaces 17 of the centering elements 6 also takes place. In this regard, the two collar surfaces 22 and 29 of the first collar 21 and of the second collar 28 preferably have the same outer dimension, in particular the same outside diameter. So that both collar surfaces 22 and 29 can actually be laid against the alignment surfaces 17 and supported there, the centering elements 6 should have a thickness or an axial expanse that is greater than the thickness or height of one of the two collars 21, 28 in the axial direction.

Once the two pipe pieces 3, 4 are aligned with one another, the second loose flange ring 12 should be set over the second pipe piece 4 and aligned with the centering bolts 16. This takes place in that the centering bolts 16 are accommodated by or pass through the respective second passage openings 10 of the second flange ring 12. The two flange rings 11, 12 are disposed on sides of the respective collar 21, 28 of the two pipe pieces 3, 4 that face away from one another, in each instance.

Once reciprocal alignment has taken place, multiple connection elements 23 are inserted into first passage openings 9 of the first loose flange ring 11 that are still free, and into the corresponding second passage openings 10 of the second flange ring 12 that are also still free, and tightened to form the flange connection 5. Subsequently, removal of the centering apparatus 1 takes place, as does insertion of further connection elements 23 into the remaining passage openings 9, 10 of the two flange rings 11, 12 that are still free. Finally, the further connection elements 23 are also tightened.

Once the two pipe pieces 3, 4 have been brought into a position in which they are aligned with one another, preferably centered, and if they are situated between the at least two centering elements 6, they can be brought into a position in which they lie against one another at their face surfaces 20, 27. Furthermore, however, in this way the first longitudinal axis 14 of the first pipe piece 3 can also be aligned in a coaxial alignment with regard to the second longitudinal axis 15 of the second pipe piece 4.

Here again, it would also be possible to insert or provide at least one sealing element 32 between the two pipe pieces 3, 4, in particular between the first face surface 20 and the second face surface 27, which faces it, as has already been described above. Here again, a flat seal has been selected as the sealing element 32, which is indicated with broken lines. However, one or more O-rings could also be used as the sealing element 32, or in addition to the flat seal.

Furthermore, here, too, it can be advantageous if an axial gap is also formed between the centering elements 6 and at least one first flange surface 26 of the first loose flange ring 11, which surface faces the centering elements 6, and a second flange surface 30 of the second loose flange ring 12, in the case of a tightened flange connection 5 and thereby in the case of a position of the first loose flange ring 11 in which it lies on the first collar 21 of the first pipe piece 3, and a position of the second loose flange ring 12 in which it lies on the second collar 28 of the second pipe piece 4. In order to achieve this, the axial thickness or height of the centering elements 6 should be selected to be smaller than the thickness or height of the two collars 21 and 28 in the same axial direction.

In conclusion, it should be mentioned that in the selection of the dimensions and the tolerances of the centering apparatus 1, in particular its centering openings 7 and the respective centering bolt 16 to be inserted into them, such a fit selection is made in which a problem-free joining process is made possible, and sufficiently precise positioning or alignment is achieved for the respective application case.

The exemplary embodiments show and describe possible embodiment variants of the centering apparatus 1 and different methods of assembly of a fitting 2 with a pipe piece 3, 4 or of a first pipe piece 3 with a second pipe piece 4, wherein it should be noted at this point that the invention is not restricted to the embodiment variants of the same that are specifically shown, but rather, instead, diverse combinations of the individual embodiment variants with one another are also possible, and this variation possibility lies within the ability of a person skilled in the art of this technical field, on the basis of the teaching for technical action provided by the present invention.

The scope of protection is determined by the claims. However, the description and the drawings should be referred to for interpreting the claims. Individual characteristics or combinations of characteristics from the different exemplary embodiments shown and described can represent independent inventive solutions by themselves. The task on which the independent inventive solutions are based can be derived from the description.

All the information regarding value ranges in the present description should be understood to mean that they include any and all partial ranges of them; for example, the statement 1 to 10 should be understood to mean that all partial ranges, proceeding from the lower limit 1 and including the upper limit 10, are included, i.e. all partial ranges start with a lower limit of 1 or more and end at an upper limit of 10 or less, for example 1 to 1.7, or 3.2 to 8.1, or 5.5 to 10.

For the sake of good order, it should be pointed out, in conclusion, that for a better understanding of the structure of the centering apparatus 1, elements of the same or the components to be aligned for assembly, by means of the centering apparatus 1, were partly shown not to scale and/or enlarged and/or reduced in size.

REFERENCE SYMBOL LISTING 1 centering apparatus
2 fitting
3 first pipe piece
4 second pipe piece
5 flange connection
6 centering element
7 centering opening
8 accommodation opening
9 first passage opening
10 second passage opening
11 first flange ring
12 second flange ring
13 longitudinal axis (of the fitting)
14 longitudinal axis (first pipe piece)
15 longitudinal axis (second pipe piece)
16 centering bolt
17 alignment surface
18 partial alignment surface
19 sealing surface
20 first face surface
21 first collar
22 first collar surface
23 connection element
24 first partial section
25 second partial section
26 first flange surface
27 second face surface
28 second collar
29 second collar surface
30 second flange surface
31 third partial section
32 sealing element

The invention claimed is:

1. A method for assembly of a fitting (2), with a pipe piece (3, 4) and with a flange connection (5), in which the following method steps are carried out:
   making available the fitting (2), which has a level sealing surface (19) and multiple accommodation openings (8) disposed distributed over the outer circumference, wherein the sealing surface (19) is aligned in the perpendicular direction with reference to a longitudinal axis (13) of the fitting (2);
   making available a pipe piece (3, 4), which has a face surface (20, 27) that can face the sealing surface (19) of the fitting (2), and which has a collar (21, 28), wherein the collar (21, 28) is configured, on its outer circumference, with an outer collar surface (22, 29), and the face surface (20, 27) is aligned, with reference to a longitudinal axis (14, 15) of the pipe piece (3, 4), in the perpendicular direction to the axis;
   making available a loose flange ring (11, 12) having multiple passage openings (9, 10) disposed distributed over the circumference;
   making available a centering apparatus (1) comprising at least two centering elements (6) and at least four centering bolts (16), wherein each of the at least two centering elements has at least two centering openings (7), and each of the at least two centering openings (7) is disposed at the same normal line distance from two accommodation openings (8) of the fitting (2) that are disposed one behind the other in the circumference direction, as well as from two passage openings (9, 10) of the loose flange ring (11, 12) that are disposed one behind the other in the circumference direction, and each of the centering elements (6) is configured with an alignment surface (17) that can face the outer collar surface (22, 29) of the collar (21, 28);
   making available multiple connection elements (23), which connection elements (23) serve to connect the loose flange ring (11, 12) with the fitting (2);
   placing the at least two centering elements (6) on the fitting (2) at a distance from one another on the circumference, in a coaxial position from their centering openings (7), with regard to the accommodation openings (8) in the fitting (2);
   inserting the centering bolts (16) into the centering openings (7) of the centering elements (6), as well as into the accommodation openings (8) of the fitting (2);

bringing the pipe piece (3, 4) between the at least two centering elements (6), and, in this regard, aligning the outer collar surface (22, 29) of the collar (21, 28) with the alignment surfaces (17) of the centering elements (6);

setting the loose flange ring (11, 12) over the pipe piece (3, 4) and aligning the loose flange ring (11, 12) on the centering bolts (16), wherein the centering bolts (16) are held by the respective passage openings (9, 10) of the loose flange ring (11, 12);

inserting multiple connection elements (23) into passage openings (9, 10) of the loose flange ring (11, 12) that are still free, as well as into the corresponding accommodation openings (8) of the fitting (2), and tightening the connection elements (23);

removing the centering apparatus (1);

inserting further connection elements (23) into the remaining passage openings (9, 10) of the loose flange ring (11, 12) that are still free, as well as into the corresponding accommodation openings (8) of the fitting (2), and tightening the further connection elements (23).

2. The method according to claim 1, wherein the longitudinal axis (14, 15) of the pipe piece (3, 4) is aligned in coaxial alignment with regard to the longitudinal axis (13) of the fitting (2).

3. The method according to claim 1, wherein at least one sealing element (32) is inserted between the sealing surface (19) of the fitting (2) and the face surface (20, 27) of the pipe piece (3, 4) that faces it.

4. The method according to claim 1, wherein the accommodation openings (8) disposed in the fitting (2) are formed by threaded bores.

5. The method according to claim 1, wherein the centering bolts (16) of the centering apparatus (1) are configured, in each instance, with a first partial section (24) and a second partial section (25) that follows the first in the axial direction, wherein the first partial section (24) is provided with an outside thread and the second partial section (25) is configured to be smooth and cylindrical.

6. The method according to claim 1, wherein each of the centering bolts (16) of the centering apparatus (1) is configured with a tetragonal or hexagonal cross-section on their side that faces away from the first partial section (24).

7. The method according to claim 1, wherein at least one flange surface (26, 30) faces the centering elements (6) and in the case of a position of the loose flange ring (11, 12) on the collar (21) of the pipe piece (3, 4), lying on it in the axial direction, an axial gap is configured between the at least one flange surface (26, 30) and the centering elements (6).

8. The method according to claim 1, wherein in the case of a selected number of two centering elements (6), the centering elements (6) are disposed in a position diametrical to one another.

9. The method according to claim 1, wherein in the case of a selected number of more than two centering elements (6), the centering elements (6) are disposed distributed over the circumference.

10. The method according to claim 1, wherein the alignment surface (17) of the centering element (6) is formed by a partial section of a hollow cylinder surface.

11. The method according to claim 1, wherein the alignment surface (17) of the centering element (6) is formed by two partial alignment surfaces (18) that run at an angle toward one another and have a planar surface.

12. A method for assembly of two pipe pieces (3, 4) and a flange connection (5), in which method the following steps are carried out:

making available a first pipe piece (3), which has a first face surface (20) and which has a first collar (21), wherein the first collar (21) is configured, on its outer circumference, to have a first outer collar surface (22), and the first face surface (20) is aligned in the perpendicular direction to it with reference to a first longitudinal axis (14) of the first pipe piece (3);

making available a second pipe piece (4), which has a second face surface (27) and which has a second collar (28), wherein the second collar (28) is configured, on its outer circumference, to have a second outer collar surface (29), and the second face surface (27) is aligned in the perpendicular direction to it with reference to a second longitudinal axis (15) of the second pipe piece (4);

making available a first loose flange ring (11) having multiple first passage openings (9) disposed distributed over the circumference;

making available a second loose flange ring (12) having multiple second passage openings (10) disposed distributed over the circumference;

making available a centering apparatus (1) comprising at least two centering elements (6) and at least four centering bolts (16), wherein each of the at least two centering elements has at least two centering openings (7), and each of the at least two centering openings (7) is disposed at the same normal line distance from two first and second passage openings (9, 10) of the two flange rings (11, 12), which openings are disposed one behind the other in the circumference direction, and each of the centering elements (6) is configured with an alignment surface (17) that can face the first and the second outer collar surface (22, 29) of the first and second collars (21, 28);

making available multiple connection elements (23), which connection elements (23) serve to connect the first loose flange ring (11) with the second loose flange ring (12);

placing the at least two centering elements (6) at a distance from one another on the circumference on the first loose flange ring (11), in a coaxial position from their centering openings (7), with regard to the first passage openings (9) of the first loose flange ring (11);

inserting the centering bolts (16) into the centering openings (7) of the centering elements (6), as well as into the first passage openings (9) of the first loose flange ring (11), and fixing the at least two centering elements (6) and the centering bolts (16) in place on the first loose flange ring (11);

bringing the first pipe piece (3) between the at least two centering elements (6), and, in this regard, aligning the outer first collar surface (22) of the first collar (21) with the alignment surfaces (17) of the centering elements (6);

bringing the second pipe piece (4) between the at least two centering elements (6), and, in this regard, aligning the outer second collar surface (29) of the second collar (28) with the alignment surfaces (17) of the centering elements (6);

setting the second loose flange ring (12) over the second pipe piece (4) and aligning the second loose flange ring (12) on the centering bolts (16), wherein the centering bolts (16) are held by the respective second passage openings (10) of the second loose flange ring (12);

inserting multiple connection elements (23) into first passage openings (9) of the first loose flange ring (11) that are still free, as well as into the corresponding second passage openings (10) of the second loose flange ring (12) that are still free, and tightening the connection elements (23);

removing the centering apparatus (1);

inserting further connection elements (23) into the remaining first passage openings (9) of the first flange ring (11) that are still free, as well as into the second corresponding passage openings (10) of the second loose flange ring (12) that are still free, and tightening the further connection elements (23).

13. The method according to claim 12, wherein the two pipe pieces (3, 4) are brought into a position in which their face surfaces (20, 27) lie against one another when the pieces are brought between the at least two centering elements (6).

14. The method according to claim 12, wherein the first longitudinal axis (14) of the first pipe piece (3) is aligned in coaxial alignment with regard to the second longitudinal axis (15) of the second pipe piece (4).

15. The method according to claim 12, wherein at least one sealing element (32) is inserted between the first face surface (20) of the first pipe piece (3) and the second face surface (27) of the second pipe piece (4), which faces the first face surface.

16. The method according to claim 12, wherein in the case of a position of the first loose flange ring (11) lying on the first collar (21) of the first pipe piece (3), and in the case of a position of the second loose flange ring (12) lying on the second collar (28) of the second pipe piece (4), an axial gap is configured between the centering elements (6) and at least one flange surface (26, 30) that faces the centering elements (6).

17. A centering apparatus (1) for assembly of a fitting (2), with a pipe piece (3, 4) and a flange connection (5), or for assembly of two pipe pieces (3, 4) and a flange connection (5), having at least one centering element (6), wherein
at least two centering elements (6) are provided,
at least two centering openings (7) are configured in each of the centering elements (6), wherein the at least two centering openings (7) are disposed corresponding with two accommodation openings (8) disposed in a fitting (2) to be centered, or with two passage openings (9, 10) disposed in a loose flange ring (11, 12) to be centered;
each of the centering elements (6) has an alignment surface (17) for an outer collar surface (22) of a collar (21, 28) disposed on a pipe piece (3, 4), which surface is to be aligned;
at least four centering bolts (16) are provided, wherein a centering bolt (16) is accommodated in the at least two centering openings (7) of each of the centering elements (6);
the at least two centering elements (6) can be disposed spaced apart from one another circumferentially with reference to a longitudinal axis (14, 15) of the pipe piece (3, 4) to be centered;
wherein the alignment surface (17) of the centering element (6) is formed by two partial alignment surfaces (18) that are aligned to run at an angle toward one another and have a planar surface.

* * * * *